United States Patent Office 3,694,403
Patented Sept. 26, 1972

---

3,694,403
POLYOLEFIN COMPOSITIONS
Itsuho Aishima, Kurashiki, Yukichi Takashi, Kawasaki, and Toshinori Koseki, Tokyo, Japan, assignors to Asahi Kasei Kogyo Kabushiki Kaisha, Osaka, Japan
No Drawing. Filed Dec. 2, 1970, Ser. No. 94,549
Claims priority, application Japan, Dec. 13, 1969, 44/99,804, 44/99,805
Int. Cl. C08f 45/04
U.S. Cl. 260—41 R    10 Claims

ABSTRACT OF THE DISCLOSURE

Polyolefin compositions having excellent transparency and rigidity, said compositions comprising 30-96 parts by weight of polyolefin and 70-4 parts by weight of magnesium carbonate having a number average particle diameter smaller than about $50\mu$ and a maximum particle diameter of about $100\mu$. An unsaturated carboxylic acid or anhydride may also be added to improve the impact resistance.

---

This invention relates to polyolefin compositions having excellent transparency and rigidity.

It is well known that the transparency of a polyolefin such as polyethylene and polypropylene is improved by copolymerizing an olefin with other olefins, for example, ethylene with butene-1, by crosslinking the polyolefin with a cross-linking agent, or by incorporating thereinto a nucleating agent.

In the above copolymerizing or crosslinking method, the transparency may be improved indeed, but the rigidity is inevitably lowered.

On the other hand, in the method involving incorporating a nucleating agent, the rigidity is not lowered so much, but the transparency is not sufficiently improved.

It is also known that the rigidity of a polyolefin is improved by incorporating thereinto an inorganic filler such as glass fiber, asbestos, talc and calcium carbonate. This method is very effective to improve the rigidity, but the transparency and impact resistance are remarkably lowered.

In order to improve the rigidity of polyvinyl chloride, natural rubber or styrene-butadiene rubber, various inorganic fillers such as basic magnesium carbonate are incorporated thereinto, and the polyvinyl chloride, natural rubber or styrene-butadiene rubber compositions thus obtained have an excellent rigidity and transparency (Jap. Pat. Pub. No. 7692/67, Germ. Pat. 1929584). However, polyvinyl chloride, natural rubber or styrene-butadiene rubber per se is transparent and the incorporation of the above inorganic fillers is not effective to further increase its original transparency and even decreases it to some extent. For example, even if finely divided silicic acid, which is known as an inorganic filler for styrene-butadiene rubber, is incorporated into polyethylene, the transparency of polyethylene is hardly improved.

For improving the transparency and rupture strength of polypropylene, it is also known to incorporate thereinto the salts of unsaturated carboxylic acids and the transition metals or those Groups II and III of the Periodic Table (Belg. Pat. 703,428) but this method is not so effective in the improvement of transparency of polypropylene, and is hardly effective in the case of polyethylene.

It is, therefore, an object of this invention to provide polyolefin compositions having an excellent transparency and rigidity, overcoming the disadvantages accompanied by the prior art methods known heretofore.

In accordance with this invention, there are provided polyolefin compositions having excellent transparency and rigidity and comprising 30-96 parts by weight of polyolefin and 70-4 parts by weight of magnesium carbonate having a number average particle diameter smaller than about $50\mu$ and a maximum particle diameter of about $100\mu$. An unsaturated carboxylic acid or anhydride may also be added to improve the impact resistance.

Polyolefins which may be employed in the practice of the invention include high pressure, middle pressure and low pressure polyethylene, crystalline isotactic polypropylene, crystalline poly-n-butene and poly-4-methylpentene-1, copolymers prepared by copolymerizing more than about 80% by weight of ethylene or propylene with less than about 20% by weight of a comonomer selected from ethylene, propylene, butene-1, pentene-1, hexene-1, 3-methyl butene-1 and 4-methyl pentene-1, copolymers prepared by copolymerizing more than about 80% by weight of polyethylene or polypropylene with less than about 20% by weight of a vinyl comonomer selected from styrene, $\alpha$-methyl-styrene and vinyl chloride, a compound having an epoxy radical and less than 8 carbon atoms, a compound represented by RCOOH, a compound represented by RCOOR', a compound represented by RCN and a compound represented by RCONR'$_2$, wherein R represents hydrocarbon having at least one unsaturated double bond and 2 to 8 carbon atoms and wherein R' represents an alkyl radical having 1 to 8 carbon atoms, an aryl radical having 6 to 10 carbon atoms or a cycloalkyl radical having 5 to 10 carbon atoms.

As examples of magnesium carbonates, there may be mentioned natural magnesite [MgCO$_3$], natural hydromagnesite [3MgCO$_3$·Mg(OH$_2$)·3H$_2$O or

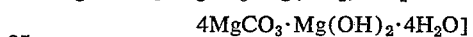

4MgCO$_3$·Mg(OH)$_2$·4H$_2$O]

and synthetic basic magnesium carbonate

[3MgCO$_3$·Mg(OH)$_2$·3H$_2$O—

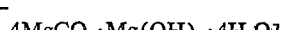

4MgCO$_3$·Mg(OH)$_2$·4H$_2$O]

and mixtures of two or more of these compounds may be used. Further, the magnesium carbonate may contain up to about 10% by weight of magnesium oxide [MgO]. The number average particle diameter of the magnesium carbonate used in this invention is smaller than about $50\mu$, preferably less than about $5\mu$, and the maximum particle diameter is about $100\mu$; magnesium carbonate having a number average particle diameter larger than about $50\mu$, is not effective.

According to the present invention, both the transparency and rigidity of polyolefins are sufficiently improved by incorporating thereinto the above mentioned magnesium carbonate. Further, the impact resistance of polyolefins is remarkably improved by additionally incorporating thereinto an unsaturated carboxylic acid of its anhydride.

Suitable examples of such unsaturated carboxylic acids or anhydrides include acrylic acid, methacrylic acid, crotonic acid, vinylacetic acid, maleic acid, maleic anhydride, linoleic acid, sorbic acid, 2-pentenoic acid, 2-octenoic acid, micholithenic acid, 2,4-pentadienoic acid, diallyl acid, eleostearic acid, ximenynic acid, erythrogenic acid, fumaric acid, mesaconic acid, citraconic acid, glutaconic acid, muconic acid, polyenedicarboxylic acid, and cinnamic acid, and they comprise a hydrocarbon radical having at least one unsaturation and 2 to 50 carbon atoms, and a carboxyl portion comprising 1 to 10 carboxylic acid or anhydride radicals. Two or more such compounds may be used in combination.

The proportion of the magnesium carbonate to be incorporated into the polyolefin is about 70-4% by weight, preferably about 60-5% and especially about 50-10% by weight, of the total weight of the composition.

The proportion of the additionally incorporated unsaturated carboxylic acid or its anhydride is about 0.01–10.00% by weight, preferably about 0.1–5.0% by weight, of the total weight of the magnesium carbonate and unsaturated carboxylic acid or its anhydride.

In order to prepare the compositions of this invention having excellent transparency and rigidity, the polyolefin and magnesium carbonate must be uniformly mixed in a melt, if necessary together with the unsaturated carboxylic acid or its anhydride, at a temperature of from about 150° C. to 400° C., preferably from about 200° C. to 250° C. and at the same time at a temperature higher than the softening temperature of the polyolefin.

Before the thorough mixing under the conditions mentioned above, it is preferable to pre-mix the polyolefin, magnesium carbonate and unsaturated carboxylic acid or its anhydride.

Any conventional methods of mixing the polyolefin, magnesium carbonate and unsaturated carboxylic acid or its anhydride are applicable, i.e., mixing the polyolefin and magnesium carbonate after coating the magnesium carbonate with the unsaturated carboxylic acid or its anhydride, pre-mixing the polyolefin, magnesium carbonate and unsaturated carboxylic acid or its anhydride at a temperature lower than the softening temperature of the polyolefin and then raising the temperature to form a melt and continuing mixing, adding the magnesium carbonate and unsaturated carboxylic acid or its anhydride to the molten polyolefin and then thoroughly mixing them, and the like.

For the purpose of uniformly mixing, a screw extruder, Banbury mixer, mixing roll, cokneader or other conventional mixing apparatus may be conveniently employed, and for the purpose of pre-mixing a drumblender, V-type blender, Henschel mixer or other conventional mixing apparatus may be utilized.

Further, when the polyolefin, magnesium carbonate and unsaturated carboxylic acid or its anhydride are mixed in a melt, conventional radical generators such as tetravalent organotin compounds or peroxides may be incorporated therein.

The novel compositions comprising the polyolefin and magnesium carbonate are characterized by improvements in (i) mechanical properties such as tensile modulus, flexural modulus or Rockwell hardness,
(ii) thermal properties such as heat distortion temperature,
(iii) chemical properties such as adhesion, printability or flammability,
(iv) optical properties such as transparency, and
(v) moldability such as mold shrinkage or dimensional stability.

In the above properties, the improvements in transparency (represented by reduction in haze) and in rigidity (represented by increased tensile or flexural modulus) are particularly remarkable.

The novel compositions comprising the polyolefin, magnesium carbonate and unsaturated carboxylic acid or its anhydride are characterized by improvements in (i) mechanical properties such as tensile strength, tensile modulus, flexural strength, flexural modulus, Izod impact strength or Rockwell hardness,
(ii) thermal properties such as heat distortion temperature,
(iii) chemical properties such as adhesion, printability or flammability,
(iv) optical properties such as transparency, and
(v) moldability such as mold shrinkage or dimensional stability.

In the above properties, the improvement in transparency, reduction in rigidity (represented by tensile or flexural modulus) and impact resistance (represented by Izod impact strength) are particularly remarkable.

The magnesium carbonate and unsaturated carboxylic acid or its anhydride can be industrially obtained in large quantities at a low price and the mixing or pre-mixing apparatuses used in this invention are also conventional inexpensive equipment. Further, the procedure to prepare the compositions of the present invention is very simple. The compositions of the present invention and molded articles made therefrom are inexpensive and exhibit uniform properties.

The novel polyolefin compositions can accordingly be formed into films requiring excellent transparency and rigidity, or transparency, rigidity and impact resistance, into industrial precision articles particularly requiring stability and dimensional stability in addition to the fundamental properties of the polyolefin itself, and into various molded articles requiring high rigidity.

Further, the polyolefin compositions of the present invention may contain such dyestuffs, pigments, fillers, stabilizers, plasticizers or other compatible plastics as do not detract from their desirable characteristics.

The following examples, wherein all parts are by weight unless otherwise expressed, will serve to illustrate this invention more fully and practically. The results of the following Examples 1 to 12 are hereinafter shown in Table 1, and the results of the Examples 13, 14, 15, 16, 17 and 18 are shown in Tables 2, 3, 4, 5, 6 and 7 respectively.

EXAMPLE 1

7 kg. of powdered polyethylene having a density of 0.95 and a melt index of 1.0 and 3 kg. of platy basic magnesium carbonate having a number average particle diameter of 0.44μ and a maximum particle diameter of 1μ were well mixed using a high-speed agitator and then the resulting mixture was pelletized by extruding at a temperature of 200° C.

The pellets so obtained were compression-molded and various properties of the resulting molded article were measured.

EXAMPLE 2

7 kg. of powdered ethylene-propylene block copolymer (15–85 by weight) having a boiling n-heptane extraction residue of 94% and a number average molecular weight of 200,000 and 3 kg. of platy basic magnesium carbonate having a number average particle diameter of 0.31μ and a maximum particle diameter of 0.7μ were well mixed using a high-speed agitator and then the resulting mixture was pelletized by extruding at a temperature of 200° C. These pellets were compression-molded and various properties of the resulting molded article were measured.

EXAMPLE 3

8 kg. of powdered polypropylene having a boiling n-heptane extraction residue of 92% and an average molecular weight of 190,000 and 2 kg. of platy basic magnesium carbonate having a number average particle diameter of 0.44μ and a maximum particle diameter of 1μ were well mixed using a high-speed agitator; the resulting mixture was pelletized by extruding at a temperature of 200° C. The pellets were compression-molded and various properties of the resulting molded article were measured.

EXAMPLE 4

7 kg. of powdered high density polyethylene having a density of 0.95 and a melt index of 0.5, 3 kg. of platy basic magnesium carbonate having a number average particle diameter of 0.44μ and a maximum particle diameter of 1μ and 100 g. of acrylic acid were well mixed using a high-speed agitator, and then the resulting mixture was pelletized by extruding at a temperature of 230° C. The pellets were compression-molded and various properties of the resulting molded article were measured.

EXAMPLE 5

Example 4 was repeated except that instead of polyethylene there was used powdered ethylene-propylene block copolymer having a boiling n-heptane extraction residue of 94%, an average molecular weight of 200,000 and an ethylene content of 15%.

EXAMPLE 6

Example 4 was repeated except that instead of polyethylene there was used powdered polypropylene having a boiling n-heptane extraction residue of 92% and an average molecular weight of 190,000.

EXAMPLE 7

Example 4 was repeated except that maleic acid was used instead of acrylic acid.

EXAMPLE 8

Example 4 was repeated except that sorbic acid was used instead of acrylic acid.

EXAMPLE 9

Example 4 was repeated except that methacrylic acid was used instead of acrylic acid.

EXAMPLE 10

Example 4 was repeated except that maleic anhydride was used instead of acrylic acid.

EXAMPLE 11

Example 4 was repeated using different proportions of the ingredients, viz. 9 kg. of high density polyethylene, 1 kg. of platy basic magnesium carbonate and 30 g. of acrylic acid.

EXAMPLE 12

5 kg. of platy basic magnesium carbonate having a number average particle diameter of 0.44µ and a maximum particle diameter of 1µ and 170 g. of acrylic acid were well mixed using a high-speed agitator, the resutling mixture was mixed with high density polyethylene having a density of 0.95 and a melt index of 0.5, the mass melted at a temperature of 200° C. using a Banbury mixer, and the resulting mixture was pelletized. The pellets were compression-molded and various properties of the resulting molded article were measured.

EXAMPLE 13

Example 1 was repeated except that the proportions of basic magnesium carbonate and high density polyethylene were varied as described in Table 2.

EXAMPLE 14

Example 4 was repeated therein except that the proportions of acrylic acid were varied as described in Table 3.

EXAMPLE 15

7 kg. of various polyolefins described hereinafter and 3 kg. of platy basic magnesium carbonate having a number average particle diameter of 0.44µ and a maximum particle diameter of 1µ were well mixed using Banbury mixer and then the resulting mixture was pelletized by extruding at a temperature of 200° C. These pellets were compression-molded and various properties of the resulting molded articles were measured.

(15–1) Low density polyethylene having a density of 0.92 and melt index of 3.0.
(15–2) Ethylene-vinyl acetate copolymer having a density of 0.93, a melt index of 3.5 and a content of vinyl acetate of 14%.
(15–3) Ethylene-ethylacrylate copolymer having a density of 0.93, a melt index of 6.0 and a content of ethylacrylate of 20%.
(15–4) Mixture of 70% by weight of high density polyethylene having a density of 0.95 and a melt index of 1.0, 20% by weight of polypropylene having a boiling n-heptane extraction residue of 92% and a number average molecular weight of 190,000, and 10% by weight of ethylenepropylene block copolymers having a boiling n-heptane extraction residue of 94%, a number average molecular weight of 200,000 and a content of ethylene of 15%.

EXAMPLE 16

Example 1 was repeated except that instead of platy basic magnesium carbonate there were used following magnesium carbonates.

(16–1) Natural hydromagnesite having a number average particle diameter of 0.50µ and a maximum particle diameter of 5µ.
(16–2) Natural hydromagnesite having a number average particle diameter of 5.4µ and a maximum particle diameter of 25µ.
(16–3) Natural magnesite having a number average particle diameter of 0.50µ and a maximum particle diameter of 5µ.

EXAMPLE 17

Example 4 was repeated except that instead of acrylic acid there were used following unsaturated carboxylic acids or the anhydrides thereof.

(17–1) Crotonic acid
(17–2) 2-octenoic acid
(17–3) Micholithenic acid
(17–4) 2,4-pentadienoic acid
(17–5) Polyenediacarboxylic acid
(17–6) Cinnamic acid

EXAMPLE 18

Example 4 was repeated except that following radical generators were additionally incorporated thereinto.

(18–1) 2,5-di-methyl-2,5-di(t-butyl peroxy) hexyne (3) . . . 0.01 weight percent (based on the total weight of the composition)
(18–2) Di-(t-butyl) tin oxide . . . 0.5%

In order to illustrate the superiority of the novel compositions, comparative tests were carried out as described in following Examples 19 to 23 and the results are set out in Table 8.

COMPARATIVE EXAMPLES 19–21

High density polyethylene described in Example 4, ethylenepropylene block copolymer described in Example 2 and polypropylene described in Example 3 were compression-molded respectively, and various properties of the resulting molded articles were measured.

COMPARATIVE EXAMPLE 22

7 kg. of powdered high density polyethylene having a density of 0.95 and a melt index of 1.0 and 3 kg. of spindle-shaped calcium carbonate having a number average particle diameter of 2µ were well mixed using a high-speed agitator and the resulting mixture was pelletized by extruding at a temperature of 230° C. The pellets were compression-molded and various properties of the resulting molded article were measured.

COMPARATIVE EXAMPLE 23

9 kg. of high density polyethylene having a density of 0.95 and a melt index of 0.5 and 1 kg. of zinc maleate were well mixed using a high-speed agitator, the resulting mixture was pelletized by extruding at a temperature of 200° C., and the pellets were compression-molded; various properties of the resulting molded article were measured.

In the following tables which set out the results of the tests on the shaped structures of the foregoing examples, the properties were measured as follows:

Haze _____ ASTM D1 003-61.
Tensile strength _____ ASTM D638-61T unit kg./mm.² (Cross head speed 0.2 in./min.).
Flexural modulus _____ ASTM D790-63.
Izod impact strength _____ ASTM D256-56 unit ft.-lb./inch (notched).
Heat distortion temperature ___ ASTM D648-58T unit °C. (Fiber stress 66 p.s.si.).

TABLE 1

| | Composition | | | | | | Properties | | | | |
|---|---|---|---|---|---|---|---|---|---|---|---|
| | Polyolefin | | Filler | | Unsaturated carboxylic acid | | Haze, percent (thickness 0.2 mm.) | Tensile strength, kg./cm.² | Flexural modulus, kg./mm.² | Izod impact strength, kg. cm./ cm., notch | Heat distortion temperature, 264 p.s.i., °C. |
| Ex. No. | Kind | Part, b.w. | Kind | Part, b.w. | Kind | Part, b.w. | | | | | |
| 1 | High density polyethylene | 70 | Basic magnesium carbonate | 30 | | | 26.8 | 220 | 285 | 1.5 | 65.7 |
| 2 | Ethylene propylene block copolymer | 70 | do | 30 | | | 20.0 | 284 | 325 | 1.4 | 78.4 |
| 3 | Polypropylene | 80 | do | 20 | | | 20.3 | 321 | 351 | 1.4 | 80.0 |
| 4 | High density polyethylene | 70 | do | 30 | Acrylic acid | 1 | 26.8 | 306 | 215 | 16.6 | 69.2 |
| 5 | Ethylene propylene block copolymer | 70 | do | 30 | do | 1 | 20.0 | 372 | 225 | 15.4 | 78.4 |
| 6 | Polypropylene | 70 | do | 30 | do | 1 | 20.3 | 410 | 243 | 11.2 | 89.1 |
| 7 | High density polyethylene | 70 | do | 30 | Maleic acid | 1 | 26.5 | 272 | 212 | 13.5 | 68.5 |
| 8 | do | 70 | do | 30 | Sorbic acid | 1 | 26.0 | 263 | 210 | 12.1 | 68.3 |
| 9 | do | 70 | do | 30 | Methacrylic acid | 1 | 26.4 | 306 | 213 | 15.4 | 69.0 |
| 10 | do | 70 | do | 30 | Maleic anhydride | 1 | 26.4 | 270 | 215 | 13.0 | 68.3 |
| 11 | do | 90 | do | 10 | Acrylic acid | 0.3 | 47.5 | 253 | 130 | 10.9 | 57.2 |
| 12 | do | 50 | do | 50 | do | 1.7 | 30.6 | 354 | 298 | 16.0 | 79.3 |

TABLE 2

| | Composition | | | | | | Properties | | | | |
|---|---|---|---|---|---|---|---|---|---|---|---|
| | Polyolefin | | Filler | | Unsaturated carboxylic acid | | Haze, percent (thickness 0.2 mm.) | Tensile strength, kg./cm.² | Flexural modulus, kg./mm.² | Izod impact strength, kg. cm./ cm., notch | Heat distortion temperature, 264 p.s.i., °C. |
| Ex. 13 | Kind | Part, b.w. | Kind | Part, b.w. | Kind | Part, b.w. | | | | | |
| Comparative test | High density polyethylene | 97 | Basic magnesium carbonate | 3 | | | 70.0 | 223 | 90 | 9.0 | 51.9 |
| 13-1 | do | 95 | do | 5 | | | 51.2 | 223 | 124 | 8.7 | 54.5 |
| 13-2 | do | 90 | do | 10 | | | 47.5 | 221 | 221 | 4.5 | 61.2 |
| 13-3 | do | 70 | do | 30 | | | 26.8 | 220 | 285 | 1.5 | 65.7 |
| 13-4 | do | 50 | do | 50 | | | 30.6 | 220 | 355 | 0.9 | 82.0 |

TABLE 3

| | Composition | | | | | | | Properties | | | | |
|---|---|---|---|---|---|---|---|---|---|---|---|---|
| | Polyolefin | | Filler | | Unsaturated carboxylic acid | | | Haze, percent (thickness 0.2 mm.) | Tensile strength, kg./cm.² | Flexural modulus, kg./mm.² | Izod impact strength, kg. cm./ cm., notch | Heat distortion temperature, 264 p.s.i., °C. |
| Ex. 14 | Kind | Part, b.w. | Kind | Part, b.w. | Kind | | Weight percent [1] | | | | | |
| Comparative test | High density polyethylene | 70 | Basic magnesium carbonate | 30 | Acrylic acid | | 15 | 28.0 | 304 | 200 | 10.5 | 70.0 |
| 14-1 | do | 70 | do | 30 | do | | 10 | 27.2 | 310 | 210 | 17.3 | 70.0 |
| 14-2 | do | 70 | do | 30 | do | | 5 | 27.0 | 310 | 214 | 17.4 | 69.8 |
| 14-3 | do | 70 | do | 30 | do | | 3.2 | 26.8 | 306 | 215 | 16.6 | 69.2 |
| 14-4 | do | 70 | do | 30 | do | | 0.1 | 26.8 | 295 | 251 | 10.1 | 69.0 |

[1] Based on total weight of unsaturated carboxylic acid and filler.

TABLE 4

| | Composition | | | | | Properties | | | | |
|---|---|---|---|---|---|---|---|---|---|---|
| | Polyolefin | | Filler | | | Haze, percent (thickness 0.2 mm.) | Tensile strength, kg./cm.² | Flexural modulus, kg./mm.² | Izod impact strength, kg. cm./ cm., notch | Heat distortion temperature, 264 p.s.i., °C. |
| Ex. 15 | Kind | Part, b.w. | Kind | Part, b.w. | | | | | | |
| Comparative test | Low density polyethylene | 100 | | | | 39 | 120 | (¹) | 50 | (¹) |
| Do | E-VAc copolymer | 100 | | | | 30 | 170 | (¹) | 50 | (¹) |
| Do | E-EA copolymer | 100 | | | | 33 | 106 | (¹) | 50 | (¹) |
| Do | HDPE-PP-EP block mixture | 100 | | | | 83 | 231 | 92 | 25 | 59.3 |
| 15-1 | Low density polyethylene | 70 | Basic magnesium carbonate | 30 | | 21 | 132 | 83 | 50 | 46.0 |
| 15-2 | E-VAc copolymer | 70 | do | 30 | | 20 | 195 | 85 | 50 | 49.1 |
| 15-3 | E-EA copolymer | 70 | do | 30 | | 19 | 154 | 79 | 50 | 42.5 |
| 15-4 | HDPE-PP-EP block mixture | 70 | do | 30 | | 34 | 230 | 265 | 2.5 | 68.8 |

[1] Not measurable because of low modulus.

TABLE 5

| | Composition | | | | Properties | | | | |
|---|---|---|---|---|---|---|---|---|---|
| | Polyolefin | | Filler | | Haze, percent (thickness 0.2 mm.) | Tensile strength, kg./cm.² | Flexural modulus, kg./mm.² | Izod impact strength, kg. cm./cm., notch | Heat distortion temperature, 264 p.s.i., °C. |
| Ex. 16 | Kind | Part, b.w. | Kind | Part, b.w. | | | | | |
| Comparative test | High density polyethylene | 100 | | | 78.0 | 224 | 86 | 9.6 | 51.4 |
| 16-1 | do | 70 | Hydromagnesite (0.50) | 30 | 28.4 | 221 | 254 | 1.6 | 66.0 |
| 16-2 | do | 70 | Hydromagnesite (5.4) | 30 | 25.3 | 223 | 210 | 1.8 | 64.1 |
| 16-3 | do | 70 | Magnesite (0.5) | 30 | 30.4 | 223 | 256 | 1.5 | 65.3 |

TABLE 6

| | Composition | | | | | | Properties | | | | |
|---|---|---|---|---|---|---|---|---|---|---|---|
| | Polyolefin | | Filler | | Unsaturated carboxylic acid | | Haze, percent (thickness 0.2 mm.) | Tensile strength, kg./cm.² | Flexural modulus, kg./mm.² | Izod impact strength, kg. cm./cm., notch | Heat distortion temperature, 264 p.s.i., °C. |
| Ex. 17 | Kind | Part | Kind | Part | Kind | Part | | | | | |
| 17-1 | High-density polyethylene | 70 | Basic magnesium carbonate | 30 | Crotonic acid | 1 | 27.0 | 301 | 214 | 15.1 | 69.5 |
| 17-2 | do | 70 | do | 30 | 2-octenoic acid | 1 | 26.9 | 265 | 213 | 12.4 | 68.9 |
| 17-3 | do | 70 | do | 30 | Micholithenic acid | 1 | 26.5 | 263 | 213 | 11.9 | 68.6 |
| 17-4 | do | 70 | do | 30 | 2,4-pentadienoic acid | 1 | 26.4 | 295 | 214 | 16.3 | 69.3 |
| 17-5 | do | 70 | do | 30 | Polyenedicarboxylic acid | 1 | 26.4 | 299 | 213 | 15.9 | 68.7 |
| 17-6 | do | 70 | do | 30 | Cinnamic acid | 1 | 26.9 | 265 | 211 | 11.4 | 67.8 |

TABLE 7

| | Composition | | | | | | | | Properties | | | | |
|---|---|---|---|---|---|---|---|---|---|---|---|---|---|
| | Polyolefin | | Filler | | Unsaturated carboxylic acid | | Radical generator | | Haze, percent (thickness 0.2 mm.) | Tensile strength, kg./cm.² | Flexural modulus, kg./mm.² | Izod impact strength, kg. cm./cm., notch | Heat distortion temperature, 264 p.s.i., °C. |
| Ex. 18 | Kind | Part, b.w. | Kind | Part, b.w. | Kind | Part, b.w. | Kind | Percent [1] | | | | | |
| Comparative test | High density polyethylene | 70 | Basic magnesium carbonate | 30 | Acrylic acid | 1 | | | 26.8 | 306 | 215 | 16.6 | 69.2 |
| 18-1 | do | 70 | do | 30 | do | 1 | ([2]) | 0.01 | 24.1 | 295 | 211 | 22.5 | 67.7 |
| 18-2 | do | 70 | do | 30 | do | 1 | ([3]) | 0.05 | 24.2 | 283 | 210 | 21.1 | 66.9 |

[1] Based on total weight of polyolefin, magnesium carbonate, unsaturated carboxylic acid and radical generator.
[2] 2,5-dimethyl-2,5-di(t-butylperoxy) hexyne (3).
[3] Di(t-butyl) tin oxide.

TABLE 8

| | Composition | | | | | | Properties | | | | |
|---|---|---|---|---|---|---|---|---|---|---|---|
| | Polyolefin | | Filler | | Unsaturated carboxylic acid | | Haze, percent (thickness 0.2 mm.) | Tensile strength, kg./cm.² | Flexural modulus, kg./mm.² | Izod impact strength, kg. cm./cm., notch | Heat distortion temperature, 264 p.s.i., °C. |
| Comparative Ex. No. | Kind | Part, b.w. | Kind | Part, b.w. | Kind | Part, b.w. | | | | | |
| 19 | High density polyethylene | 100 | | | | | 78.0 | 224 | 86 | 9.6 | 51.4 |
| 20 | Ethylene-propylene block copolymer | 100 | | | | | 39.6 | 305 | 131 | 10.7 | 65.0 |
| 21 | Polypropylene | 100 | | | | | 41.2 | 347 | 162 | 1.4 | 65.8 |
| 22 | High density polyethylene | 70 | Calcium carbonate | 30 | | | 93.2 | 215 | 150 | 1.6 | 60.3 |
| 23 | do | 90 | Zinc maleate | 10 | | | 76.1 | 235 | 114 | 6.1 | 56.5 |

It will be appreciated that the instant specification and examples are set forth by way of illustration and not limitation and that various modifications and changes may be made without departing from the spirit and scope of the present invention.

What is claimed is:

1. Transparent, rigid polyolefin compositions consisting essentially of 30–96 parts by weight of crystalline polyolefin, 70–4 parts by weight of magnesium carbonate having a number average particle diameter smaller than about 50μ and a maximum particle diameter of about 100μ, and an ethylenically unsaturated carboxylic acid or anhydride to the extent of 0.01–10.00% based on the total weight of magnesium carbonate and unsaturated carboxylic acid or anhydride, said unsaturated carboxylic acid or anhydride being selected from the group consisting of acrylic acid, methacrylic acid and their anhydrides.

2. Polyolefin compositions as claimed in claim 1, wherein said polyolefin is polyethylene.

3. Polyolefin compositions as claimed in claim 1, wherein said polyolefin is polypropylene.

4. Polyolefin compositions as claimed in claim 1, wherein said polyolefin is a copolymer comprising more than about 80% by weight of ethylene and less than about 20% by weight of a comonomer selected from propylene, butene-1, pentene-1, hexene-1, 3-methyl butene-1 and 4-methyl pentene-1.

5. Polyolefin compositions as claimed in claim 1, wherein said polyolefin is a copolymer prepared by copolymerizing more than about 80% by weight of polyethylene and less than about 20% by weight of a vinyl comonomer selected from styrene, α-methyl-styrene, vinyl chloride, a compound represented by RCOOR', a compound represented by RCN and a compound represented by RCONR'₂, wherein R represents hydrocarbon having at least one unsaturated double bond and 2 to 8 carbon atoms and wherein R' represents an alkyl radical having 1 to 8 carbon atoms, an aryl radical having 6 to 10 carbon atoms or a cycloalkyl radical having 5 to 10 carbon atoms.

6. Polyolefin compositions as claimed in claim 1, wherein said polyolefin is a copolymer comprising more than about 80% by weight of propylene and less than about 20% by weight of a comonomer selected from ethylene, butene-1, pentene-1, hexene-1, 3-methyl butene-1 and 4-methyl pentene-1.

7. Polyolefin compositions as claimed in claim 1, wherein said polyolefin is a copolymer prepared by copolymerizing more than about 80% by weight of propylene with less than about 20% by weight of a vinyl comonomer selected from styrene, α-methyl-styrene, vinyl chloride, a compound represented by RCOOR', a compound represented by RCN and a compound represented by RCONR₂, wherein R represents hydrocarbon having at least one unsaturated double bond and 2 to 8 carbon atoms and wherein R' represents an alkyl radical having 1 to 8 carbon atoms, an aryl radical having 6 to 10 carbon atoms or cycloalkyl radical having 5 to 10 carbon atoms.

8. Polyolefin compositions as claimed in claim 1, wherein said magnesium carbonate is basic magnesium carbonate.

9. Polyolefin compositions as claimed in claim 1, wherein said unsaturated carboxylic acid is acrylic acid.

10. Polyolefin compositions as claimed in claim 1, wherein said unsaturated carboxylic acid is methacrylic acid.

References Cited

UNITED STATES PATENTS

| | | | |
|---|---|---|---|
| 2,311,613 | 2/1943 | Slayter | 260—41 A |
| 3,408,320 | 10/1968 | Brucksch | 260—31.8 PQ |
| 3,455,871 | 7/1969 | Coover | 260—41 |
| 3,313,764 | 4/1967 | Iino | 260—41.5 |
| 3,456,038 | 7/1969 | Newman | 260—41 |
| 3,517,086 | 6/1970 | Shirayama | 260—41 |

FOREIGN PATENTS

| | | |
|---|---|---|
| 993,197 | 5/1965 | Great Britain. |
| 1,044,503 | 10/1966 | Great Britain. |
| 1,463,139 | 10/1965 | France. |

OTHER REFERENCES

Kirk-Othmer, "Encyclopedia of Chemical Technology," 2nd edition, volume 14, 1967, pp. 217, 223.

Handbook of Chemistry and Physics, 47th edition, 1966, pp. B-278 and B-281.

Brandup & Immergut, "Polymer Handbook," J. Wiley & Sons, 1966, pp. VI-45, 46, 61.

Derwent Belgian Patents Report, 1968, Pat. No. 703,-428, Derwent Pubs. Ltd., London, Eng.

MORRIS LIEBMAN, Primary Examiner

P. R. MICHL, Assistant Examiner

U.S. Cl. X.R.

260—23 H